(12) United States Patent
Kesti et al.

(10) Patent No.: US 7,141,133 B2
(45) Date of Patent: Nov. 28, 2006

(54) METHOD OF CONFORMING A FILM TO A SURFACE

(75) Inventors: Michael R. Kesti, Minneapolis, MN (US); Frank T. Sher, St. Paul, MN (US); Stephen J. Aden, West St. Paul, MN (US); Ronald S. Steelman, Woodbury, MN (US); John R. David, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 242 days.

(21) Appl. No.: 10/325,509

(22) Filed: Dec. 19, 2002

(65) Prior Publication Data

US 2003/0150547 A1 Aug. 14, 2003

Related U.S. Application Data

(60) Provisional application No. 60/346,572, filed on Jan. 8, 2002.

(51) Int. Cl.
*B32B 37/10* (2006.01)

(52) U.S. Cl. .............. 156/212; 156/252; 156/253; 156/286

(58) Field of Classification Search ............. 156/258, 156/286, 212, 513, 514, 252, 253
See application file for complete search history.

(56) References Cited

U.S. PATENT DOCUMENTS

| | | | |
|---|---|---|---|
| 326,160 A | 9/1885 | Seaver et al. | |
| 1,433,971 A * | 10/1922 | Roberts | 156/87 |
| 1,672,093 A | 6/1928 | Sadtler | |
| 1,895,045 A | 1/1933 | Moore | |
| 2,983,305 A * | 5/1961 | Scher et al. | 156/247 |
| 3,853,669 A | 12/1974 | Werstlein | |
| 3,861,988 A | 1/1975 | Preisler | |
| 3,962,016 A | 6/1976 | Alfter et al. | |
| 4,204,904 A | 5/1980 | Tabor | |
| 4,261,783 A | 4/1981 | Finke | |
| 4,274,202 A | 6/1981 | Petrick | |
| 4,326,909 A | 4/1982 | Slavik | |
| 4,370,374 A | 1/1983 | Raabe et al. | |
| 4,751,121 A | 6/1988 | Kuhnel et al. | |
| 4,867,816 A | 9/1989 | Suiter | |
| 4,944,514 A | 7/1990 | Suiter | |

(Continued)

FOREIGN PATENT DOCUMENTS

DE         807 073         6/1951

(Continued)

OTHER PUBLICATIONS

Computer-Aided Sign Making; Ten Steps to Successful Vinyl Truck Lettering; H. Brady, SignCraft Magazine; Issue 74 Jan./Feb. 1994.

*Primary Examiner*—Sam Chuan Yao
*Assistant Examiner*—Barbara J. Musser
(74) *Attorney, Agent, or Firm*—James D. Christoff

(57) ABSTRACT

Methods of applying film to substrates are provided wherein the film matingly conforms to the configuration of the substrate, including areas adjacent protrusions or depressions in the substrate. In certain embodiments, the film is punctured by a probe and a vacuum is applied to the probe in order to aspirate air and urge the film toward a position of compliance with the substrate. Optionally, the film is softened by heat in order to facilitate conformance with the shape of the substrate.

19 Claims, 7 Drawing Sheets

U.S. PATENT DOCUMENTS

| | | |
|---|---|---|
| 5,296,277 A | 3/1994 | Wilson et al. |
| 5,346,571 A * | 9/1994 | Condon et al. ............. 156/212 |
| 5,362,516 A | 11/1994 | Wilson et al. |
| 5,800,919 A | 9/1998 | Peacock et al. |
| 6,197,397 B1 | 3/2001 | Sher et al. |
| 6,311,399 B1 | 11/2001 | Steelman et al. |
| 6,520,234 B1 | 2/2003 | Anderson et al. |
| 6,649,128 B1 * | 11/2003 | Meyer et al. ................ 422/63 |
| 2002/0092611 A1 | 7/2002 | Anderson et al. |

FOREIGN PATENT DOCUMENTS

| | | |
|---|---|---|
| DE | 197 33 935 | 2/1999 |
| EP | 0 354 230 | 3/1992 |
| EP | 0 787 539 | 1/1997 |
| FR | 2 300 249 | 3/1976 |
| FR | 2 643 487 | 8/1990 |
| JP | 63059517 | 3/1988 |
| JP | 01123723 | 5/1989 |
| JP | 05016600 | 1/1993 |
| JP | 08267398 | 10/1996 |
| JP | 10 199906 | 7/1998 |
| WO | WO 92/17870 | 10/1992 |
| WO | WO 97/31077 | 8/1997 |
| WO | WO 98/29516 | 7/1998 |
| WO | WO 00/43196 | 7/2000 |
| WO | WO 00/43220 | 7/2000 |

* cited by examiner

METHOD OF CONFORMING A FILM TO A SURFACE

This application claims priority to U.S. Provisional Patent Application Ser. No. 60/346,572 filed Jan. 8, 2002.

BACKGROUND OF THE INVENTION

1. Field of the Invention

This invention relates to methods for applying adhesive films to surfaces. More particularly, the present invention relates to methods for applying adhesive films to surfaces in such a manner that the resultant shape of the film closely matches the shape of the underlying surface.

2. Description of the Related Art

Adhesive films find many uses in modern commerce. For example, large graphic images used in advertising and other public displays are printed on films adhered to walls and other surfaces by means of pressure activated adhesives. As used herein, the term pressure activated adhesive will include conventional tacky pressure sensitive adhesives as well as adhesives (including repositionable adhesives) which may contain particulates, adhesive microspheres, microreplicated topographies, or other like adhesive systems in which adhesion is initiated by pressure applied between the adhesive and the substrate to be adhered.

Since many of the surfaces to which adhesive graphic films are to be adhered contain protrusions, depressions and other irregularities, it is useful to use films which are readily conformable to such surfaces, or to use thermoplastic films which can be made conformable by heating. It is common practice in the installation of such materials to first laminate the film to a surface using reasonable care to produce a smooth lamination, without wrinkles, followed by more localized lamination procedures such as pressing with pads or brushes and piercing areas of entrapped air. In the case of thermoplastic films, conformance can be further aided by selective heating of the film in areas of surface irregularity while applying pressure by means of resilient tools such as pads and brushes in order to conform the film to the surface. It is also common practice to pierce detached regions, for example bubbled areas, to allow release of trapped air while pressing down on the detached region to produce conformance and adhesion. A useful tool for producing holes for the release of air is disclosed in U.S. Pat. No. 6,311,399, wherein resiliently mounted pins press against a laminated film and penetrate the film in areas of air entrapment, so as to provide paths for the release of entrapped air. Entrapped air in detached regions may also escape through channels within the adhesive layer. Adhesive systems such as Comply™ Performance Graphic Marking Films, commercially available from 3M Company, and disclosed in U.S. Pat. No. 6,197,397, comprise microstructured channels within the adhesive layer that allow escape of entrapped air.

While various adhesive films, especially thermoplastic adhesive films, have found wide commercial application, there remains a need for easier and faster methods of conforming graphic films to irregular substrates such as riveted structures that are commonly found on semi-trailers and truck van bodies. Since riveted structures tend to have large numbers of rivet heads requiring treatment to improve conformance, the speed of performing this operation becomes especially important. There is also a need for a method of conforming films to irregular surfaces with less risk of damage to the surface of such films. Some protection against surface damage, either during lamination or during subsequent use, may be provided by laminating a transparent protective film, or overlaminate, over a graphic film. However, when such overlaminates are used, the overall film construction becomes thicker and therefore stiffer, which may make conforming of the film to surface irregularities more difficult.

The risk of damage to the film becomes greater when brushes or pads are used to press heat-softened thermoplastic films into conformance with irregular surfaces. Moreover, the current methods of conforming films to irregular surfaces are often physically demanding, in that they require not only skill, but also a significant amount of physical strength and endurance. Additionally, current methods can be ergonomically demanding, in that they often require simultaneous use of a heat source and several other tools, such as an air release tool for producing air release holes in the film along with a brush or pad for pressing the film into contact with the surface. The task is made more difficult by the environment in which this must be done, for example, by standing next to the side of a semi-trailer or other large surface.

SUMMARY OF THE INVENTION

The present invention provides methods of conforming adhesive films to surfaces of substrates, wherein the surfaces may have protrusions such as rivet heads, bolt heads or overlapped joints or depressions such as recesses, cavities and the like. A method of applying a film to a substrate according to one embodiment includes the following:

providing a film having a layer of adhesive placing the film on a substrate such that a portion of the adhesive layer is in contact with the substrate;

selecting a region between the film and the substrate where the adhesive layer is not in contact with the substrate;

providing an aperture in the film adjacent the detached region; and applying vacuum to the selected region through the aperture in order to aspirate air from the region and urge the film adjacent the detached region toward the substrate.

The present invention is also directed to a method of conforming an adhesive film to a substrate that comprises the following:

providing a film having a layer of adhesive;

placing the film on a substrate such that a portion of the adhesive layer is in contact with the substrate;

selecting a detached section of the film;

providing an aspirator probe;

applying vacuum to the probe;

urging said probe against the detached section of the film with sufficient pressure to form an aperture; and aspirating air from the space between the detached section of the film and the substrate in order to urge the detached section of the film toward the substrate.

The present invention is also directed toward assemblies of a film and a substrate, wherein the films are applied by either of the methods set out above.

In an embodiment wherein the film is thermoplastic and relatively stiff at room temperature but soft and conformable at elevated temperatures, the method involves heating the film in areas adjacent certain regions, hereinafter called detached regions, where the film does not conform to the underlying surface to which it is to be adhered, and penetrating the detached film section with an aspirator probe at a suitable location so as to remove the entrapped air from the detached region at a rate sufficient to reduce the air pressure beneath the film to a level which enables atmospheric pressure to press the film into conformance and complemental contact with the underlying surface. As used herein, the term aspirator probe will refer to any device having an aperture connected to a vacuum source. In one embodiment of the present invention, the aspirator probes are capable of forming apertures in the film to be adhered when applied to heat softened detached regions of such films. In other embodiments, the aspirator probes are capable of piercing apertures in unheated films. The apertures so formed match the shape and size of the probe sufficiently well to provide a pressure reduction beneath the detached region which is effective in allowing atmospheric pressure to press the detached film against the surface in a tightly fitted, conformed relationship.

As used in connection with the present invention, the term "vacuum" is used to describe negative pressure as compared to ambient pressure. The term does not require that an absolute or extremely negative pressure vacuum be drawn or maintained, although in some instances it may be possible and/or desirable to achieve large negative pressures in connection with the present invention.

DETAILED DESCRIPTION OF THE PREFERRED EMBODIMENTS

Figure 1:
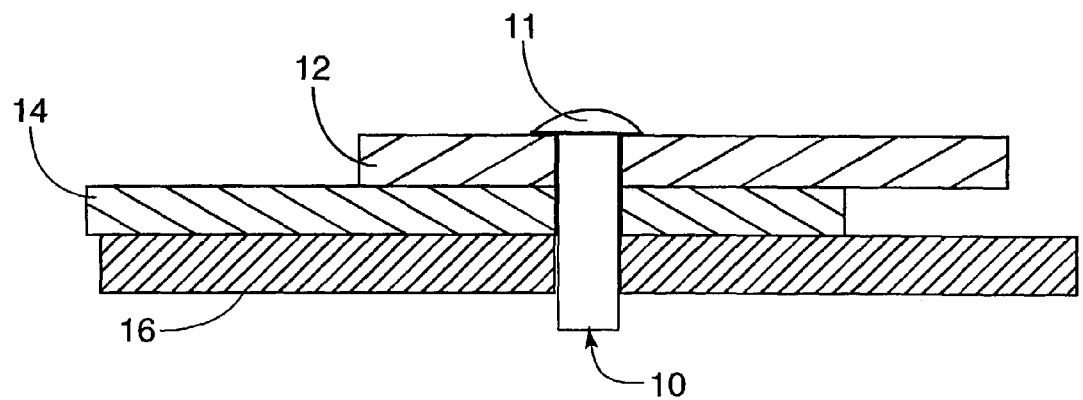
FIG. 1 is a fragmentary view taken in partial cross-section along a horizontal reference plane of an exemplary structure, not necessarily to scale, to which a film is to be applied.

FIG. 1 portrays an exemplary substrate or structure to which adhesive films are commonly applied. Structures of this sort may occur, for example, in truck bodies, especially van and semi-trailer bodies, wherein overlapping panels 12 and 14 are aluminum side panels and member 16 is a vertical frame member inside the van body. The structure is held together by rivet 10, having head 11, which protrudes above the exterior surface of panel 12.

Figure 2:
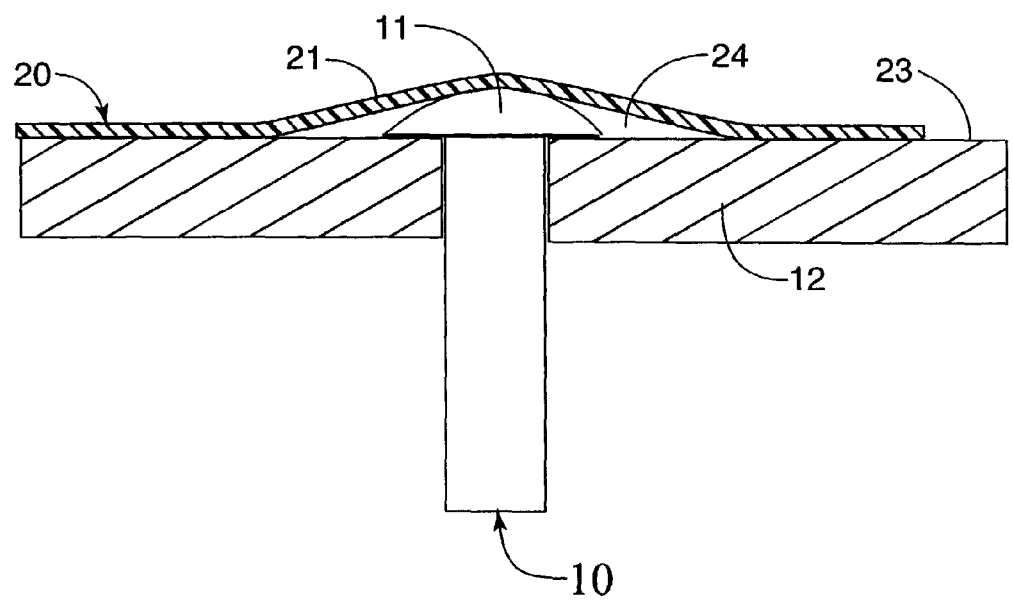
FIG. 2 is an enlarged view showing a portion of FIG. 1, and additionally illustrating a section of a film that is applied to the structure.

Referring to FIG. 2, film 20 comprises a backing and a pressure activated adhesive layer, wherein the adhesive layer is adjacent to surface 23 of panel 12. In one embodiment, film 20 comprises a thermoplastic backing, which is durable at room temperature but soft and conformable at elevated temperatures. It has been found that commonly used thermoplastic film materials, such as plasticized polyvinyl chloride, polyolefin polymers and copolymers, and a variety of polyesters, exhibit a range of suitable temperatures above their softening points at which the method of the present invention can be used. It will be understood that some film materials having softening points at or below room temperature may be suitable for some applications of the present invention without the heating step. Additionally, multilayer films, such as those comprising an overlaminate, as well as single layer films, have been found useful in the present invention. Also, since many pressure activated adhesives exhibit thermoplastic properties, conformance of the adhesive layer to the surface can also be improved by embodiments of the present invention in which heat is applied as part of the conforming process. Suitable adhesive films are commercially available from 3M Company, and are commonly called marking films. Examples include 3M™ Scotchcal™ Marking Film, available from 3M Company, St. Paul, Minn., and thermoformable 3M™ Scotchlite™ Reflective Sheeting, also available from 3M Company. It is an advantage of the present invention that film materials which might not have been previously suitable as adhesive laminating films can now be used, due to greater latitude in heating which is made possible by the reduced mechanical contact occurring during the conforming process.

Film 20 is applied by, for example, hand lamination, over surface 23 and rivet head 11. As a result, detached region 24 is formed by a detached section 21 of film 20 which is held away from panel 12 by rivet head 11, a phenomenon referred to as tenting. Similarly, if film 20 is laminated over a depression, a phenomenon called bridging occurs, wherein film 20 covers the depression without conforming to it. While film tenting and bridging may or may not have significant effects on the appearance of the laminated film, they can have a detrimental effect on the long-term durability of the film. For example, if weathering or other adverse conditions cause embrittlement or cracking of film 20, the unsupported section 21 may tear or be removed entirely, while damage to the attached portion of film 20 may be much less visible due to the fact that it is supported and held in place by surface 23.

While the present invention is useful for conforming relatively small detached sections of film to a surface the methods of the present invention are not so limited. It has been found that larger detached sections of film can be conformed to a surface by the method of the present invention using easily learned techniques. In one embodiment, wherein film 20 is thermoplastic, detached sections near the periphery of the detached region are first heat softened and aspirated, followed by repeated application of heat and aspiration to the remaining detached region. The volume of the detached region becomes progressively smaller, until the entire detached film section has been conformed and adhered to the surface. An alternative technique which has been found useful for conforming large detached sections of film is to insert the aspirator probe into the film in the detached region, without applying vacuum, then start the vacuum, and finally heat portions of the film adjacent the detached region, beginning in the areas farthest from the aspirator probe, while maintaining aspiration. In the case of film which is highly conformable at room temperature, heating may not be necessary to produce acceptable conformance.

Figure 3:
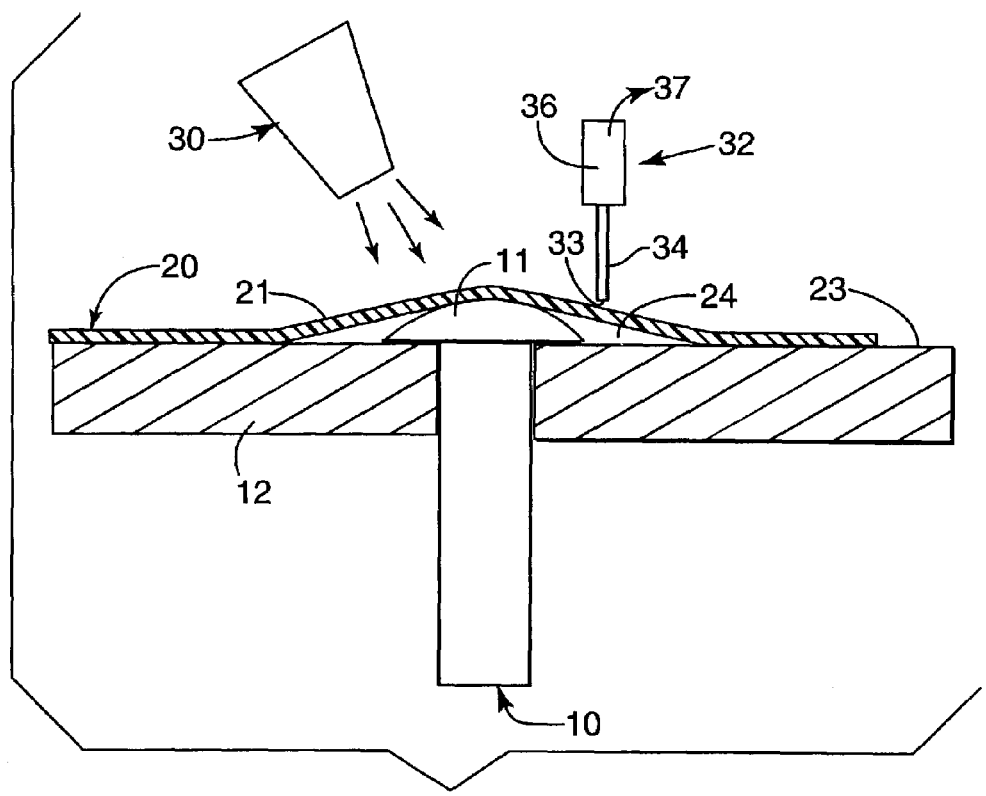
FIG. 3 is a view somewhat similar to FIG. 2 and additionally showing in schematic form a heat source and an aspirator probe.

Referring to FIG. 3, an apparatus for carrying out an embodiment of the method of the present invention is portrayed schematically. The apparatus includes heat source 30 and aspirator probe 32. Heat source 30 may be, for example, a source of heated air which is blown at detached film section 21, a radiant heat source, or any other heat source capable of heating detached film section 21 to a suitable temperature without scorching, burning, or otherwise damaging the film. Energy for heat source 30 may be from an electrical source, from combustion of a fuel, or from any other suitable source. It is preferred that detached film section 21 be heated to a temperature above its softening point, and preferably to a temperature where most, and preferably all, residual stresses are relieved, but not so hot that the film 20 loses its integrity, becomes scorched, or is otherwise damaged.

Referring again to FIG. 3, aspirator probe 32 comprises a contact portion 34 and a connector portion 36. Contact portion 34 may be, for example, a metal tube or hollow needle having end 33 with an opening, wherein the end 33 is squarely cut off in a plane perpendicular to the central cylindrical axis of the tube. It has been found that metal tubes having outer and inner diameters similar to 10 to 22 gauge hypodermic syringe needles are particularly suitable. Tubing of this sort is available from Aldrich Scientific, 1001 West Saint Paul Avenue, Milwaukee, WI 53233. As specified by Aldrich, hypodermic tubing of the 10 gauge size has an inside diameter of about 2.7 millimeters and an outside diameter of about 3.4 millimeters. Hypodermic tubing of the 20 gauge size has an inside diameter of about 0.58 millimeters and an outside diameter of about 0.90 millimeters.

The optimal gauge depends on several factors, including the heat source type and temperature, film type, film thickness, the amount of detached film, and vacuum level and airflow characteristics of the vacuum source. It has been found that 15–20 gauge tubing is preferred for typical graphic marking films applied over rivets. Smaller diameter tubes tend to reduce the flow rate of the probe. Reduced flow rates can, in some cases, have a detrimental effect on the net pressure differential achievable in pressing film section 21 against rivet head 11 and surface 23. Reduced flow rates may also reduce the speed at which conformance of film section 21 against rivet head 11 and panel 12 is achieved. Larger diameter tubes, on the other hand, tend to produce larger apertures in the film 20, which may have a detrimental effect on appearance. It has been found that the particular material used to make the tubes is not critical, though metal tubes, particularly tubes made of stainless steel hypodermic needle tubing, have the advantage of durability. It will be appreciated that while cylindrical tubing has been found suitable, other cross-sectional shapes may also be used, and may in some instances offer advantages, which would cause them to be preferred. Moreover, while cylindrical tubes of constant cross section have the advantage of simplicity, it may be useful in some instances to use tubes of varying or adjustable cross sectional dimension. For example, a short tube of small diameter which contacts the film might then expand or be replaced by a larger diameter tube for enhanced airflow and less risk of clogging. Also, different probe tip configurations may be appropriate for different applications. For example, probe tips, which are squarely cut in a plane perpendicular to the axis of the tube to produce a flat tip, have been found suitable for applications wherein the film is heated prior to aspiration. On the other hand, in cases wherein the probe is inserted through the film prior to heating, as might be done when aspirating very large detached regions or wherein no heating is being used, a probe with a beveled, serrated, or similar configuration that is better capable of cutting the film might be more useful. It is contemplated that assortments of probes of different configurations may be provided and that probes will be easily removed and installed, so that the user can select the most appropriate probe for any particular task and, if necessary, try a variety of probe tips before deciding on the one which is most suitable.

Figure 4:
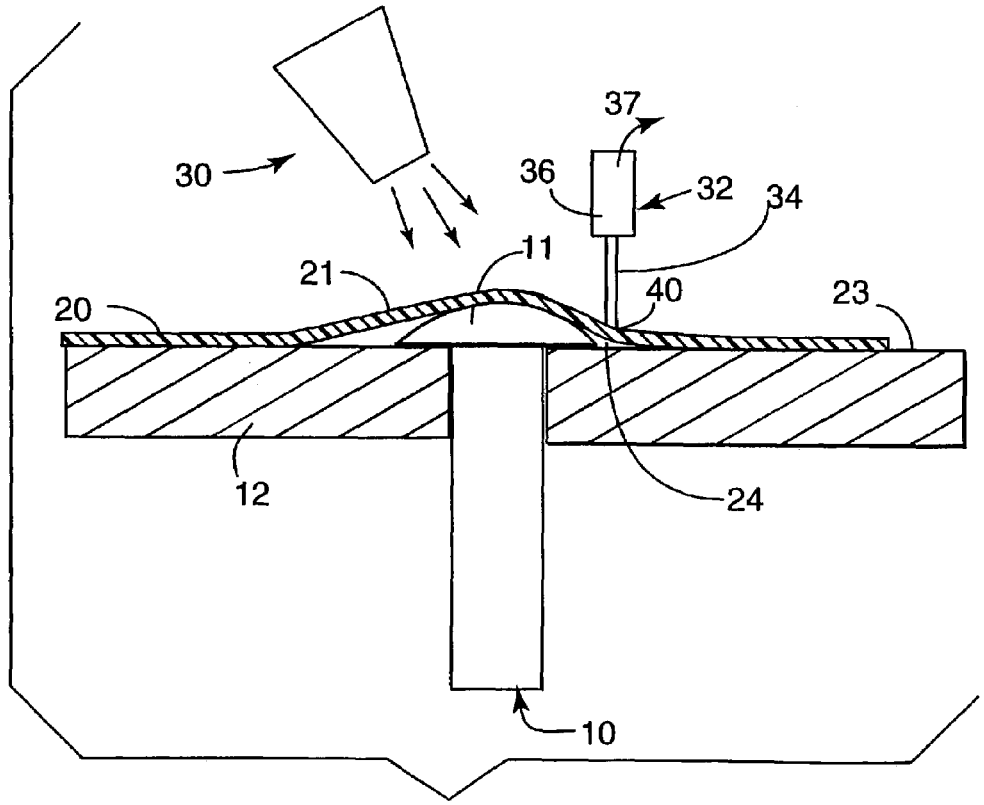
FIG. 4 is a view somewhat similar to FIG. 3 except that the probe has been shifted toward the film in order to contact a detached region of the film near the head of a rivet.
Figure 5:
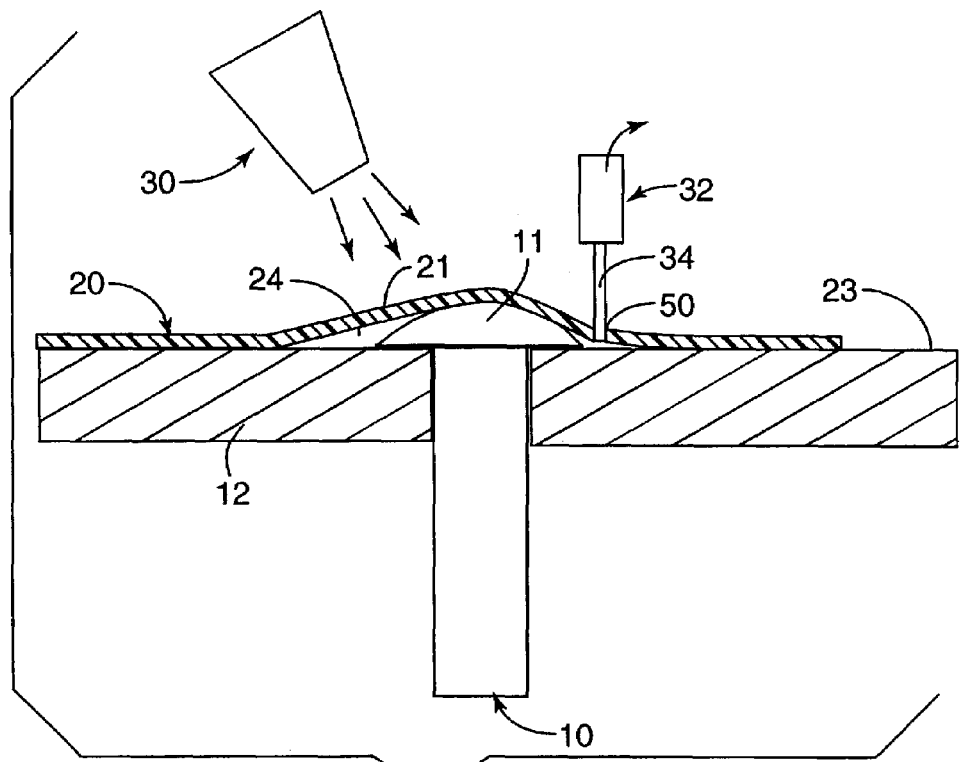
FIG. 5 is a view somewhat similar to FIG. 4 except that the probe has been moved further toward the structure in order to puncture the film.

Referring to FIG. 4, aspiration of entrapped air from detached region 24 is initiated by contacting aspirator probe 32 onto detached film section 21, and continuing to urge it against the film section 21, to form indentation 40. In one embodiment of the present invention, this downward urging is performed after heat softening of film section 21. At some point in the process, the level of heat softening and the downward force on probe 32 reach levels sufficient to produce penetration of film section 21, thereby forming aperture 50, as portrayed in FIG. 5. In one embodiment, this penetration is produced simply by exerting sufficient probe force against sufficiently heat softened film section 21, while in an alternative embodiment, a predetermined probe force is first exerted and maintained, prior to heat softening, and the film section 21 is then heated until sufficient softening occurs to allow penetration of the probe through the film section 21 and consequent formation of aperture 50. In yet another embodiment, the probe tip is able to penetrate the film section 21 without heat, and the film is conformed to the surface with or without heating, as needed, depending on the properties of the film 20 being used.

Figure 6:
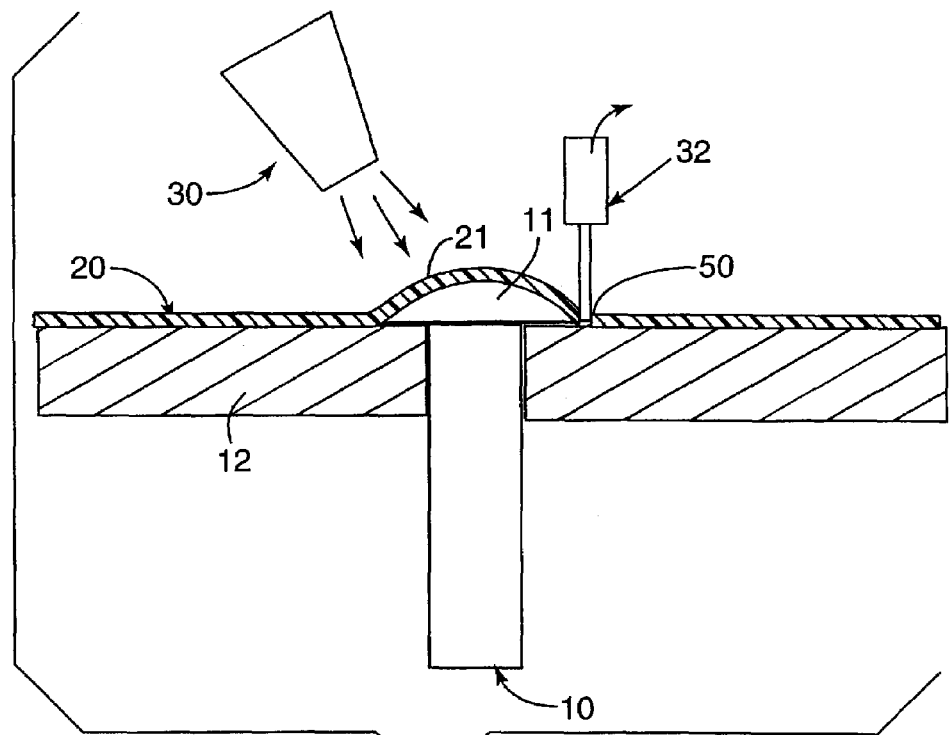
FIG. 6 is a view somewhat similar to FIG. 5 except that the film adjacent the rivet head is depicted as it appears after air has been withdrawn from the detached region adjacent the rivet head.

The inventors do not wish to be bound by any particular theory as to the exact mechanism of probe penetration through the heat softened film, and in fact observation of the penetration phenomenon under various conditions suggests that more than one mode of penetration may occur. In some instances, it appears that penetration may be aided by heat-softened film section being drawn into the probe by the vacuum applied to the probe. In other cases, the probe may mechanically cut at least a portion of the film section prior to penetration. Likewise, the exact nature of the seal between contact portion 34 of probe 32 and film section 21 is not known. Moreover, it is not known whether a significant amount of sealing occurs, or, if it does occur, the time duration of any such sealing. It appears, however, that there is sufficient restriction of flow between contact portion 34 and aperture 50 to allow sufficient net flow of air out of region 24 into probe 32 to produce a air pressure reduction in detached region 24 which is below ambient or atmospheric pressure. This pressure reduction is effective in collapsing the detached region 24 and producing surface conformance as portrayed in FIG. 6. In some instances, it appears that an aperture can be made in film section 21 with a first instrument, and that the vacuum probe can then be brought into proximity with the aperture, without actually entering the aperture, to produce sufficient air pressure reduction within detached region 24 to produce conformance. The present invention is not limited to any particular hydrodynamic model for the process of reducing air pressure within a detached region.

Figure 7:
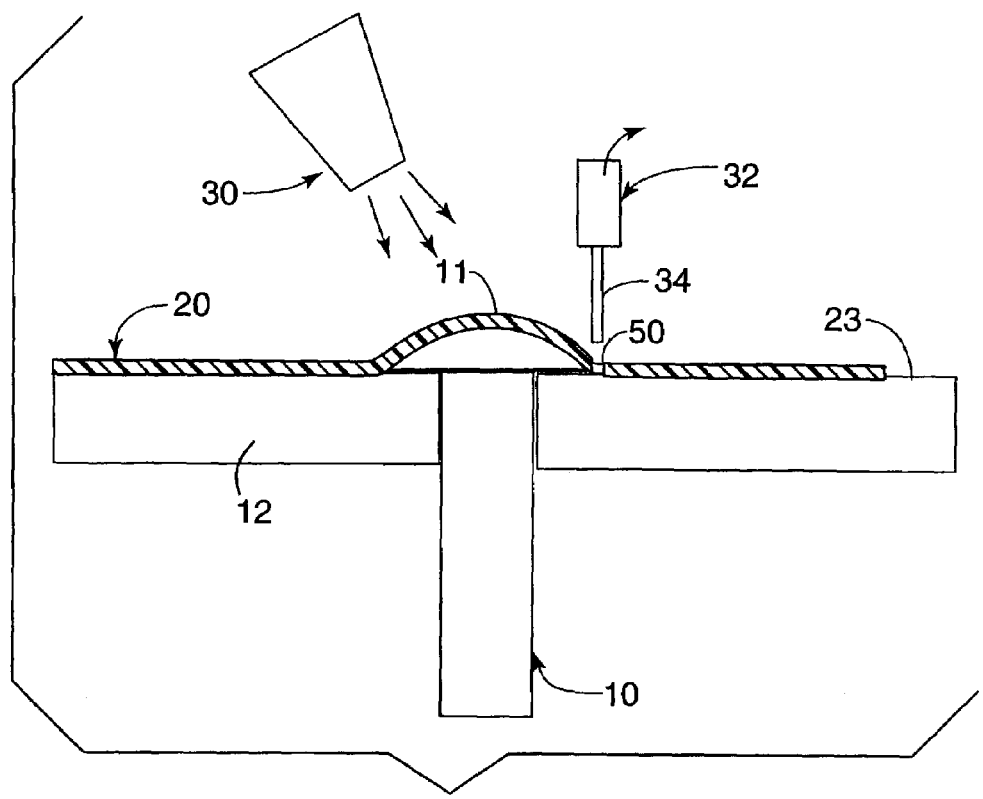
FIG. 7 is a view somewhat similar to FIG. 6 except that the aspirator probe has been shifted away from the film.

Referring to FIG. 7, after conformance has been achieved, probe 32 is retracted, leaving aperture 50, which can, by suitable choice of the size of contact portion 34, is preferably sufficiently small to be essentially inconspicuous.

The term vacuum source may include any device, including any volume or enclosure that preferably provides a reduced air pressure therein which is capable of generating a flow of air sufficient to produce an effective level of vacuum in the detached region 24 when aspirated by an aspirator probe connected to the vacuum source. Vacuum sources may be continuous or intermittent. Examples of continuous vacuum sources include piston type vacuum pumps, rotary vane type vacuum pumps, turbine type vacuum apparatus such as those used in vacuum cleaners, hydrodynamic flow generating devices such as venturi devices, and other continuous airflow apparatus which produce reduced air pressures while generating an effective level of airflow. Examples of intermittent vacuum sources include spring actuated or manually actuated pistons and diaphragms, elastic bulbs, as well as other devices which produce reduced pressure by an expansion of an enclosed volume. Vacuum tanks and other enclosed volumes from which a quantity or air has been removed can also function as vacuum sources. Vacuum sources can also include combinations of the above devices and apparatus.

As used herein, the term vacuum valve will mean any valve interposed between an aspirator probe and a vacuum source. Vacuum valves may be used to control the application of vacuum to the aspirator probe.

In one embodiment of the present invention, aspirator probe 32 is provided as a handheld device. More particularly, probe 32 is provided as a handheld probe preferably having approximately the size, shape, and general configuration of a writing instrument such as a pencil or pen, so as to take advantage of the dexterity already developed by many people in using devices of this configuration. In embodiments wherein heat is used, heating of the film can be provided by an electrically powered heat gun. Since heat guns of this sort are commercially available with air temperature sensing instrumentation and air temperature controlling systems, it has been found that operators can develop a high level of skill in producing an effective heating and aspirating sequence to achieve conformance of film section 21 around rivets and other surface irregularities without significant damage to the film 20. It is an advantage of the present invention that since there is little mechanical contact between the heated film section 21 and the aspirator probe 32, except at the point of penetration, it may be possible, in some cases, to heat the film section 21 to a higher temperature during the conforming process, without causing the sort of damage that might occur, for example, if brushes, pads, or other like devices were to contact the film 20 in its heat softened state. This additional freedom eases the operator's task and may allow improved conformance due to greater softening of the film 20.

Figure 8:
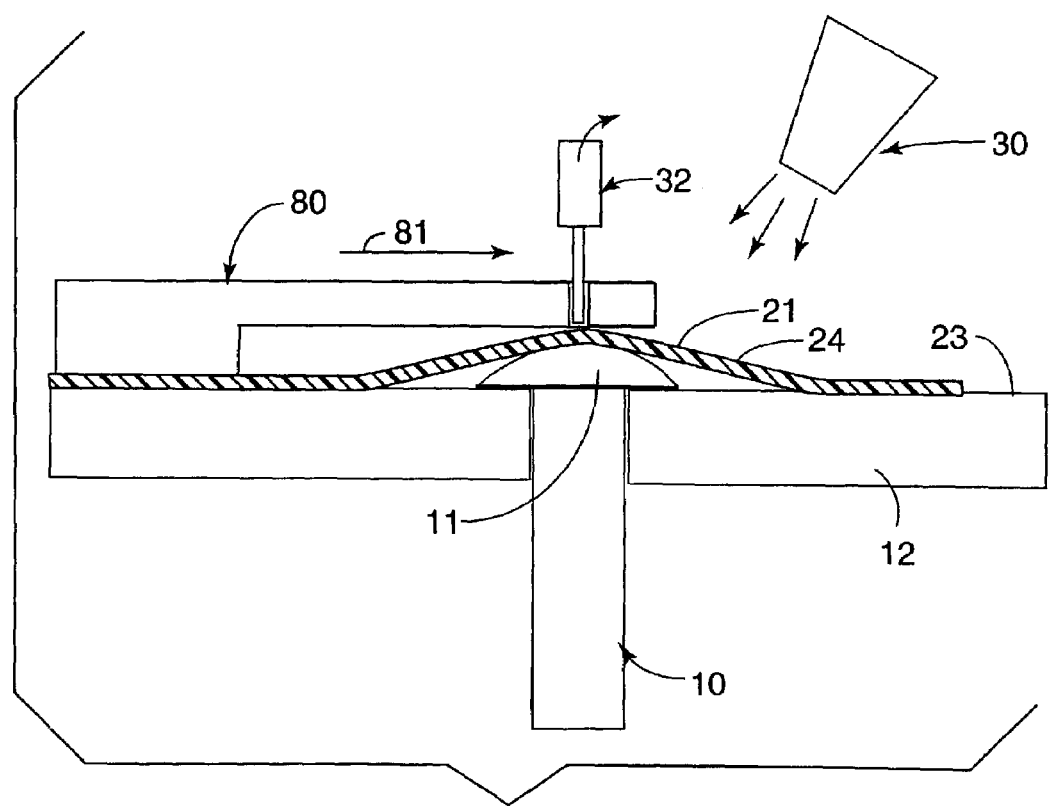
FIG. 8 is a view somewhat similar to FIG. 2 except that a holder for the probe is provided in accordance with an alternative embodiment of the invention.

In an alternative embodiment, probe 32 can be positioned and urged against detached film section 21 by use of a mechanical holding and moving means, as portrayed schematically in FIG. 8. Probe 32 is positioned in the horizontal direction, relative to, for example, rivet head 11, by probe holder 80, represented schematically in sectional side view, which rests on film 20 and is slidable thereon to position probe 32 in the horizontal direction. FIG. 8 portrays fixture 80 prior to positioning, being moved in a direction along the arrow designated by the numeral 81 for final positioning prior to aspiration.

Figure 9:
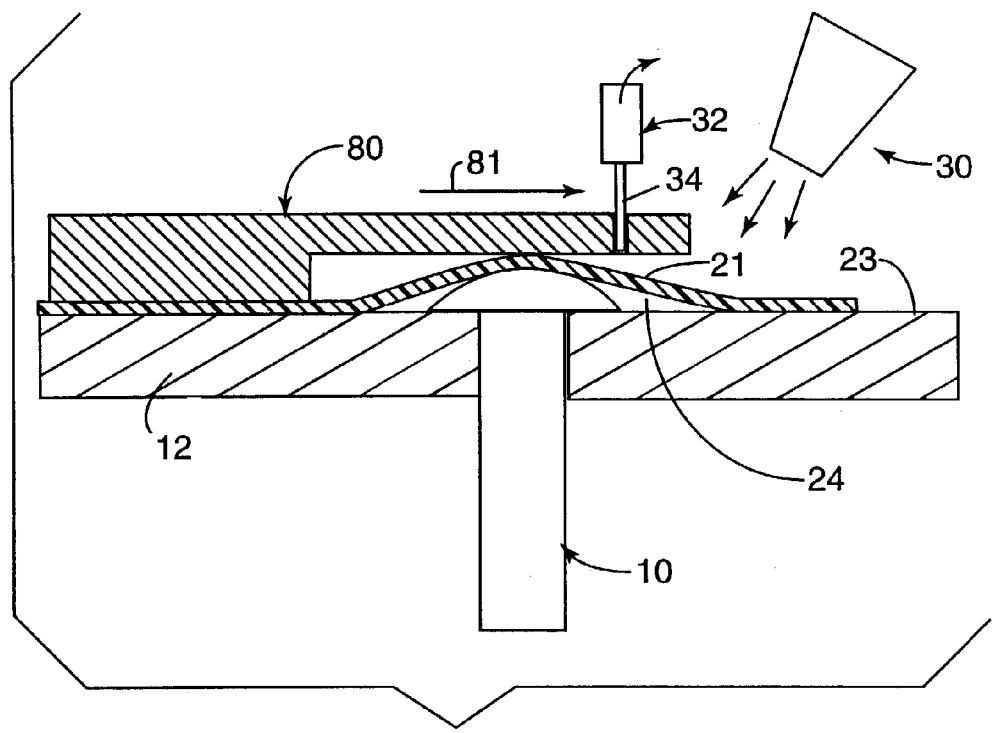
FIG. 9 is a view somewhat similar to FIG. 8 except that the holder has been shifted to move the probe toward a position adjacent a detached region of the film.

FIG. 9 portrays probe 32 in position for aspirating detached film section 21 prior to contacting the film 20. It is preferred that probe holder 80 be configured so as not to contact any portion of film 20 which is in a heat softened state, as this may produce mechanical damage to the film surface. Probe holder 80 may include locating means such as notches or other features, which engage specific mechanical features of the substrate to which film 20 is being laminated, for the purpose of locating holder 80 relative to the rivet 10 or other feature to which detached film section 21 is being conformed. For example, holder 80 may comprise one or more notches which receive other rivets in areas where film 20 is unheated, so as to be positively located relative to rivet 10. Additionally, some or all of holder 80 may be made of a transparent material to enable better viewing of the area proximate to detached region 24.

Heat source 30 is portrayed only schematically, and may take many forms, such as a hand held heat gun or a heating device incorporated into probe holder 80. Optionally, the heat source may be connected with the probe as a single, handheld unit. As an additional option, the hand held unit may include a self-contained vacuum source such as a vacuum pump.

Figure 10:
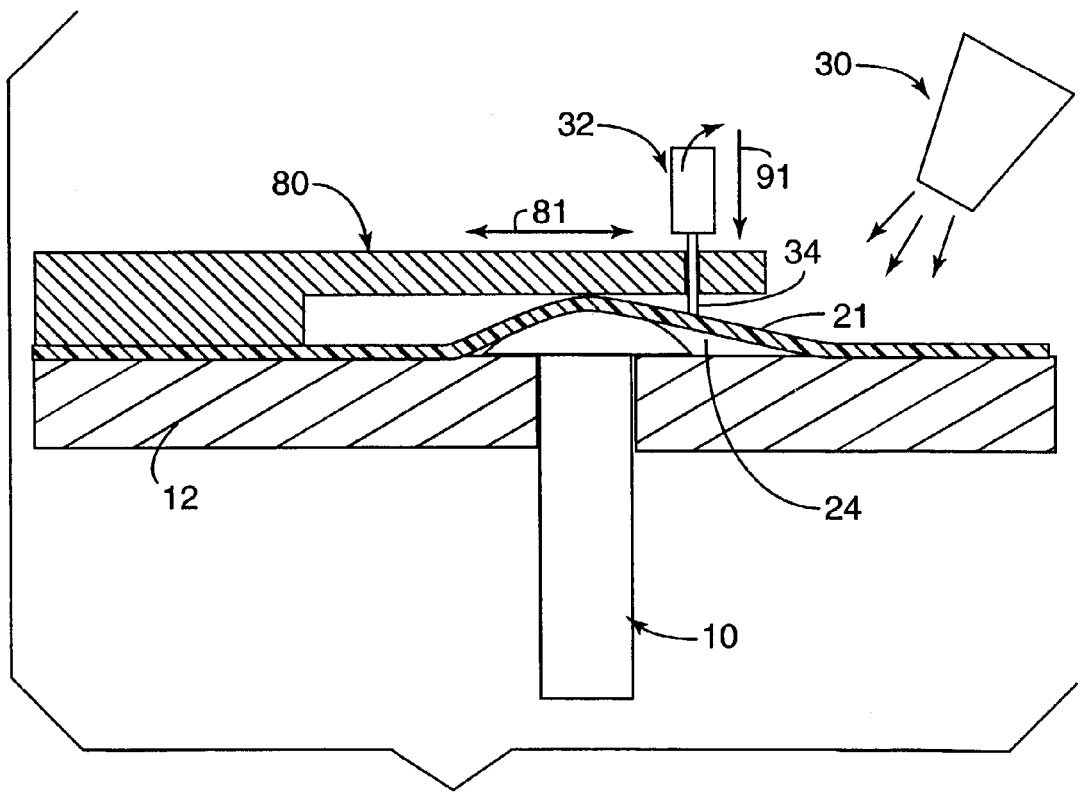
FIG. 10 is a view somewhat similar to FIG. 9 except that the probe has been shifted toward a position of contact with the film.

FIG. 10 portrays aspirator probe 32 in contact with detached film 21, just prior to penetration of film 21 and beginning of aspiration. The probe 32 is moved in the direction of the arrow 91 in order to penetrate the film. Vertical motion and urging of probe 32 against detached film 21 may be produced and controlled by any suitable means, not shown. Such urging means include manual actuation, fluid or vacuum operated actuators, mechanical linkages, electromechanical devices such as motors and solenoids, as well as springs and other resilient mechanical components.

Figure 11:
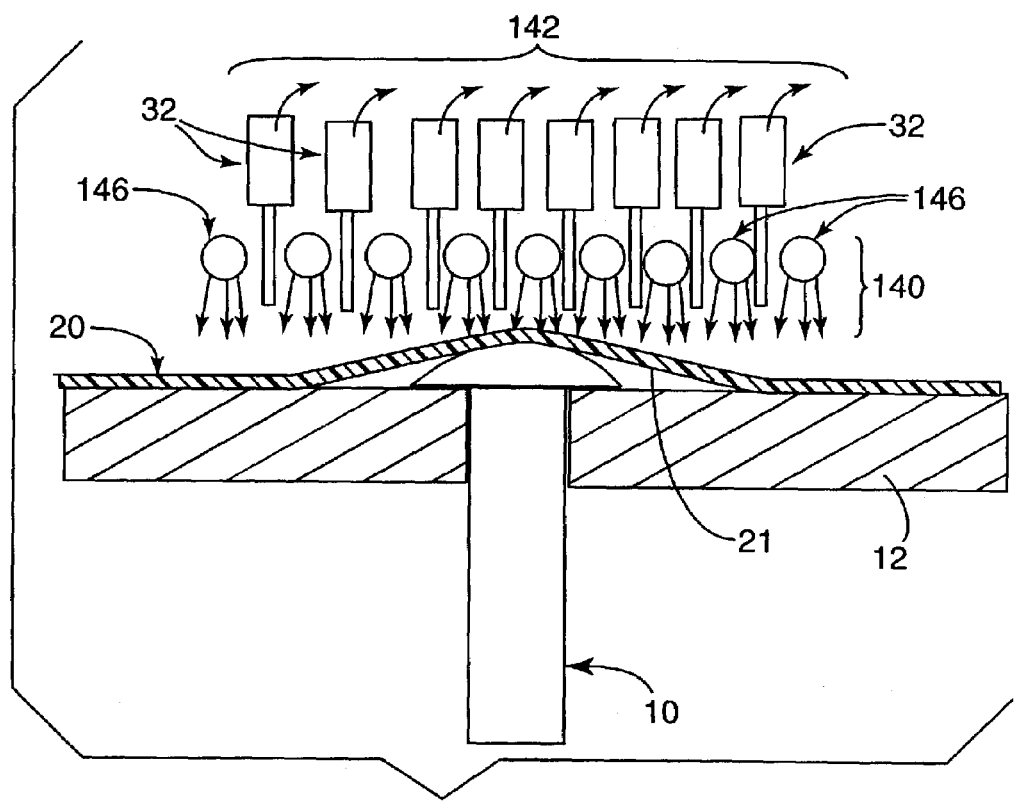
FIG. 11 is a view somewhat similar to FIG. 2 except that an array of aspirator probes and heat sources have been provided according to yet another embodiment of the invention.
Figure 12:
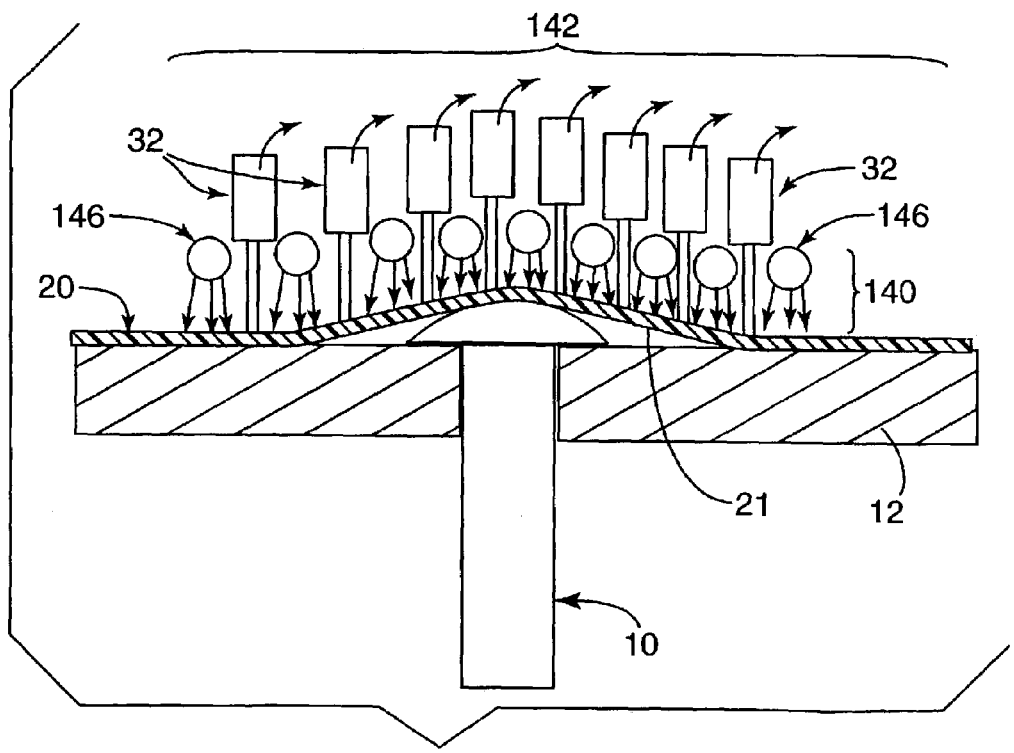
FIG. 12 is a view somewhat similar to FIG. 11 except that the array of probes and the array of heat sources has been moved toward the film.
Figure 13:
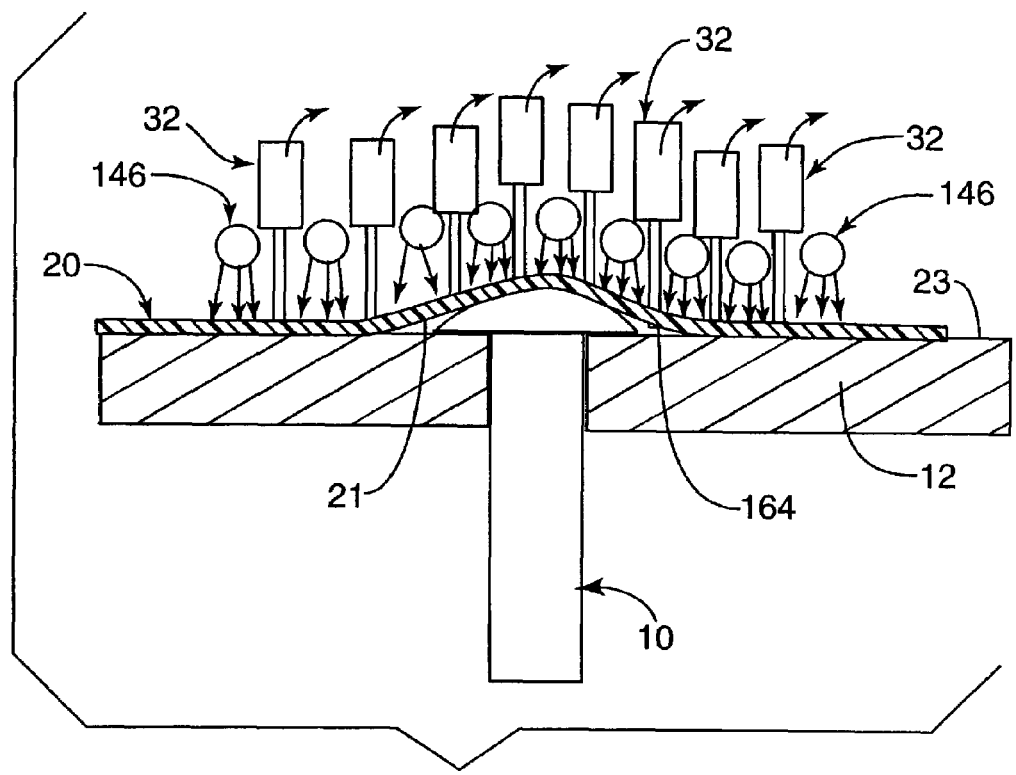
FIG. 13 is a view somewhat similar to FIG. 12 except that some of the probes have punctured the film adjacent a detached region of the film in order to aspirate air trapped within.

Referring to FIG. 11, in an alternative embodiment, an array 142 of aspirator probes 32 may be provided. In this embodiment, array 142 may also include array 140 of heating elements 146. It will be understood that while heating elements 146 are shown as separate elements, they may optionally be all part of a single heat source. For example, they could be nozzles in a single manifold carrying heated air. Heat source 140 may be a source of heated forced air, radiant heat, or other suitable heat source. In one embodiment, portrayed in FIG. 12, probes 32 are preferably independently movable and resiliently mounted so that when array 142 is lowered onto detached film section 21, each of probes 32 contacts detached film section 21 with a suitable force, without either causing or preventing other probes from also contacting film section 21. Referring to FIG. 13, one or more of probes 32 may penetrate film 21. Probes which contact the film in areas which are not detached will not penetrate, while those contacting detached areas may be expected to penetrate, as portrayed at penetration point 164.

EXAMPLES

Figure 14:
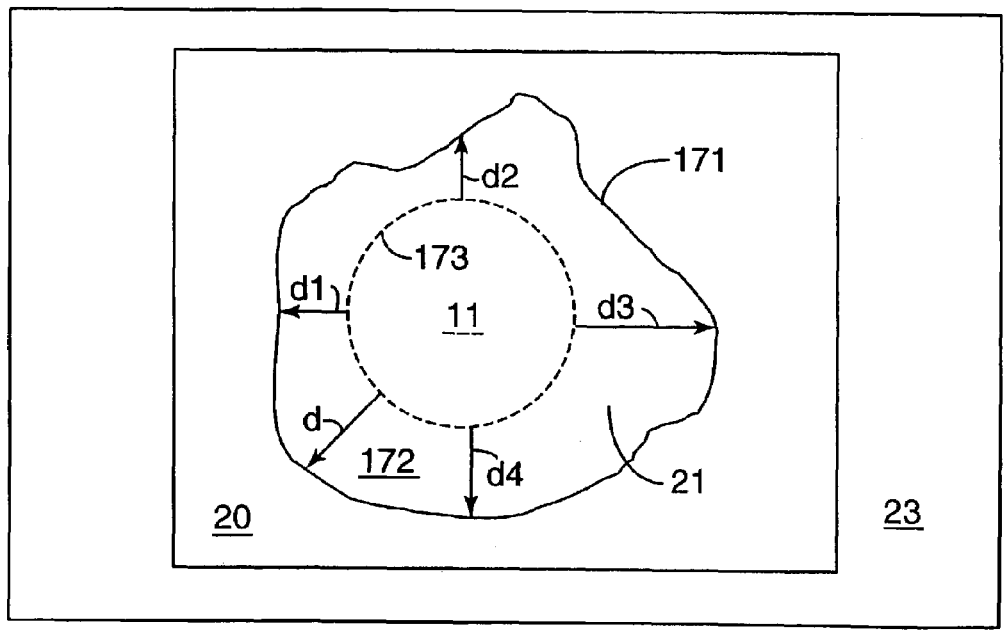
FIG. 14 is an exemplary elevational view looking in a horizontal direction toward a film that has been applied to a surface having a protrusion that initially causes the film to present an irregularly shaped detached region adjacent the protrusion.

In the following examples, conformance of thermoplastic adhesive films to test plates was visually evaluated for degree of conformance, avoidance of air entrapment, absence of wrinkles, and other damage to the film, which may have occurred during the conforming process. In the case of conformance of film over surface protrusions, a useful measure of conformance is lifting distance d, which is the distance from the point of detachment on a protrusion to the point at which the detached film section contacts the surface to which it is being adhered. In the case of complete conformance with no tenting, the film is attached completely up to the edge of the protrusion (such as the edge of a rivet head), resulting in a lifting distance of 0. Referring to FIG. 14, detached film section 21 is portrayed as having outer detachment boundary 171 and inner detachment boundary 173, wherein film 20 is attached to surface 23 outside of boundary 171 and attached to rivet head 11 inside of boundary 173, but detached in region 172, which is inside boundary 171 and outside of boundary 173. Lifting distance d is measured at several sample points, producing distances d1, d2, d3, and d4, for example. Average lifting distance D may then be reported as the average of measurements d1–d4. Since the effects of film detachment are primarily visual, the location of boundaries 171 and 173 are determined visually, and sufficiently precise measurements can usually be made with a millimeter scale. Alternatively, a typical location may be selected for taking a single measurement, d, based upon the overall visual effect of the tenting. This process, referred to as visual averaging, has been found in many cases to give a fair portrayal of the level of conformance to the film to the surface in the areas around rivets.

Another defect arising from incomplete film attachment is air entrapment, which occurs as bubbled or wrinkled film at points near, but not adjacent to, protrusions. Wrinkles may be the result of air entrapment or of film deformation, which leaves an excess amount of film in a particular location. Air entrapment may not be permanent. If the amount of entrapped air is sufficiently small, the air may dissipate over time, thereby allowing film in the affected area to adhere uniformly to the substrate without the appearance of visual defects from the entrapped air.

Various processes of conforming thermoplastic adhesive film to surfaces can produce film damage. Such damage usually takes the form of surface abrasions, scratches, tears, or puncture holes due to tools being applied to the heat softened film to press it into place. Additionally, scorching, wrinkling, or damage due to overheating the film or to other mishaps can also occur. In the following examples, damage of these types will be reported as defects when visible. It is an advantage of the present invention that abrasion, scratching, and other surface damage caused by mechanical contact is reduced, since the film is pressed into conformance with the surface to which it is being adhered by means of air pressure differentials rather than by mechanical contact. The present invention may produce, in some instances, visible holes from penetration of the aspirator probe. The diameter of these holes is reported in millimeters (mm).

The following examples were produced by selecting various thermoplastic adhesive films, commercially available from 3M Company, St. Paul, Minn., and laminating them to painted aluminum test plates having dimensions of 10.2×30.4 centimeters, into which four test rivets had been inserted at a spacing of 7.7 centimeters, with the rivet nearest the end of the panel being at a distance of 3.5 centimeters from the end of the plate. The rivet spacing was chosen to place the rivets sufficiently far apart to avoid interaction between them during the laminating process. The test plates were painted with a standard white vehicle paint of the type commonly used on semi-trailers. The rivets were of a type commonly used in the fabrication of aluminum semi-trailer bodies, having a rivet head diameter of 12 millimeters, and a rivet head height of about 1.5 millimeters. The rivets were tightly pressed into the test panels so that the heads were seated firmly against the painted surface.

Descriptions of the films used in the following examples are given in Table 1. In Table 1, the first column gives the use of each film and the type of adhesive used for that film. In column 1, protective overlaminates are transparent films, which are laminated over graphic films, usually after imaging but before application to a surface, to provide protection for images on the graphic film.

Graphic films are films, which are capable of receiving a graphic image by such imaging means as ink jet printing, electrostatic printing, thermal transfer printing, or other graphic imaging techniques.

Changeable graphic films are those having a reduced level of adhesion, so as to allow them to be removed without the use of special equipment such as heat guns or other removal equipment.

Films having Comply™ performance are films in which the topography of the adhesive surface includes channels for the egress of air or other fluids. Adhesive surfaces having topographies of this sort are disclosed in U.S. Pat. No. 6,197,397 B1.

Controltac™ adhesive systems comprise adhesive layers having isolated protrusions, either tacky or non-tacky, on the adhesive surface. These protrusions limit initial adhesion so as to allow repositioning on a substrate prior to forming a pressure-activated bond. Adhesive systems of this type are disclosed in U.S. Pat. No. 5,296,277 and U.S. Pat. No. 5,362,516.

TABLE 1

| Function and Adhesive Type | Label | Backing |
|---|---|---|
| Scotchcal ™ Protective Overlaminate | 8908 | Clear, 2 mil (0.05 mm) Surlyn ® |
| Scotchcal ™ Protective Overlaminate | 8910 | Clear, 2 mil (0.05 mm) vinyl |
| Controltac ™ Plus ™ Changeable[1] Graphic Film with Comply ™ Performance | 3500C | White, 4 mil (0.1 mm) vinyl |
| Controltac Plus ™ Graphic Film with Comply ™ Performance | 3540C | White, 4 mil (0.1 mm), multilayer, polyolefin film |
| Controltac ™ Plus ™ Graphic Film | 180-10 | White, 2 mil (0.05 mm) vinyl |
| Controltac ™ Plus ™ Graphic Film with Comply ™ Performance | 180-10C | White, 2 mil (0.05 mm) vinyl |
| Controltac ™ Plus ™ Graphic Film with Comply ™ Performance | 8620C | White, 2 mil (0.05 mm) vinyl |

Note: The films listed in this table are commercially available from 3M Company, St. Paul, MN.

Referring to FIG. 2, the film samples were laminated to the rivet head side of the test plates using a 3M PA-1 squeegee type applicator, available from 3M Company, taking care to avoid wrinkling, but allowing smooth tenting of film 20 to occur over rivet head 11, to form detached film portion 21. Referring to FIG. 14, a typical distance d for the tented film was in the range of 8–10 millimeters after this initial application.

Several samples of each film were laminated to different test plates for testing under various conditions of aspirator probe diameter and heating conditions. Unless noted otherwise, flat-tipped, stainless steel, syringe tubing was used as aspirator probes. The vacuum source for the aspirator probes was a rotary vane vacuum pump manufactured by Gast Mfg., Inc., a Unit of IDEX Corp. of Benton Harbor, Mich. Comparative examples were also run using traditional application tools such as 3M rivet brush applicator RBA-3, 3M MPP-1 multipin punch, disclosed in U.S. Pat. No. 6,311,399, and 3M rivet finishing pad CMP-1, all commercially available from 3M Company.

Heating of laminated film samples was performed using a heavy-duty heat gun, available from McMaster-Carr, Atlanta, Ga., and designated as McMaster-Carr catalog number 3433K21. Unless otherwise noted, an air temperature setting of 427° C. (800° F.) was used. Samples were placed on a laboratory workbench during heating and aspiration. The detached film section around each rivet was heated with the heat gun, using a predetermined air temperature setting, holding the heat gun at a distance of approximately 2–7 centimeters from the film surface, for about 0.5–4.0 seconds, or until softening of the film became visible. It was found that different types of films and different thicknesses of films required different amounts of heating, but that skill in judging a sufficient amount of heating could easily be learned. Once the film had softened, the aspirator probe, which was connected to a vacuum pump, was applied to each of the tented regions at a location near the edge of the rivet head, while simultaneously removing the heat gun. After the aspirator probe had penetrated the film and conformance had been achieved, the probe was removed. Conformance of the detached film sections against the test panel was typically so rapid that a snapping sound was generated as the film became adhered to the test panel surface. The heating and aspiration process was then repeated for the remaining three rivets on each test panel. The riveted areas were then conditioned at 66° C. (150° F.) for 7 days. Each rivet on each sample was then tested for quality of conformance, as measured by detached film distance d, and absence of damage or other defects.

Comparative examples were prepared using the 3M multipin punch, MPP-1 in combination with either the 3M rivet brush applicator, RBA-3, or the 3M rivet finishing pad, CMP-1. In both cases, several small holes (~0.2 mm in diameter) were created in the detached film section around the rivet by striking the film with the MPP-1. The film was then heated with a heat gun set at the desired air temperature in a similar manner as in the Table 2 examples. Next, the appropriate finishing tool was forced against the detached film section. A circular brushing motion was used with the RBA-3, whereas one downward stroke was used with CMP-1.

Results for Examples 1–27 are shown in Table 2 and results for Comparative Examples C1–C16 are shown in Table 3. The average lifting distance, d, and the ranges of visible whole sizes for each test panel are reported. Descriptions of the film materials used in the examples reported in Tables 2 and 3 are given in Table 1.

In Table 2, the tubing used was stainless steel hypodermic tubing obtained from Aldrich Scientific. In Table 2, the visible hole size in column 6 refers to the apertures produced by the aspirator probes, while in Table 3, the visible hole size refers to holes produced by the 3M MPP-1 multipin punch used prior to heating the detached sections or holes created when pressing the detached sections down with the RBA-3 brush or the CMP-1 rivet finishing pad.

TABLE 2

| EXAMPLE NUMBER | FILM TYPE | OVER-LAMINATE | TUBING GAUGE | LIFTING DISTANCE, d, mm. | VISIBLE HOLE SIZE, mm | FILM DAMAGE |
|---|---|---|---|---|---|---|
| 1 | 3500C | None | 16G | 1.6 | 0.5–1.0 | Small wrinkle near one rivet |
| 2 | 3500C | None | 18G | 1.8 | 0.5–1.0 | None |
| 3 | 3500C | None | 20G | 1.5 | 0.5–1.0 | None |
| 4 | 3500C | 8908 | 16G | 2.6 | 1.0 | None |
| 5 | 3500C | 8908 | 18G | 1.3 | 0.5–1.0 | Change in film gloss near each rivet |
| 6 | 3500C | 8908 | 20G | 1.1 | 0.5–1.0 | Change in film gloss near each rivet |
| 7 | 3500C | 8910 | 16G | 2.4 | 1.0 | None |
| 8 | 3500C | 8910 | 18G | 1.6 | 0.5–1.0 | Small wrinkle near one rivet |
| 9 | 3500C | 8910 | 20G | 1.6 | 0.5–1.0 | None |
| 10 | 3540C | None | 16G | 1.6 | 0.5–1.0 | None |
| 11 | 3540C | None | 18G | 1.1 | 0.5–1.0 | None |
| 12 | 3540C | None | 20G | 1.0 | 0.5–2.0 | Noticeably large holes near 2 rivets |
| 13 | 180-10 | None | 11G | 0.75 | 0.2–1.0 | Entrapped air around 3 rivets, Small wrinkles around 2 rivets |
| 14 | 180-10 | None | 13G | 1.25 | 0.5–1.0 | Entrapped air around each rivet, Small wrinkles around 3 rivets. |
| 15 | 180-10 | None | 15G | 0.75 | 1.0–2.0 | Entrapped air around each rivet, Small wrinkles around 3 rivets. |
| 16 | 180-10 | None | 18G | 0.50 | 0.5–1.0 | Entrapped air around each rivet, Small wrinkles around 3 rivets. |
| 17 | 180-10C | None | 11G | 1.25 | 0.2–1.0 | None |
| 18 | 180-10C | None | 13G | 1.50 | 0.5–1.0 | None |
| 19 | 180-10C | None | 15G | 1.25 | 0.5–1.0 | None |
| 20 | 180-10C | None | 18G | 0.75 | 0.5–1.0 | Small amount of trapped air |
| 21 | 8620C | 8910 | 11G | 1.25 | 0.2–1.0 | None |
| 22 | 8620C | 8910 | 13G | 2.0 | 0.5–1.0 | Slight change in film gloss around one rivet. |

TABLE 2-continued

| EXAMPLE NUMBER | FILM TYPE | OVER-LAMINATE | TUBING GAUGE | LIFTING DISTANCE, d, mm. | VISIBLE HOLE SIZE, mm | FILM DAMAGE |
|---|---|---|---|---|---|---|
| 23 | 8620C | 8910 | 15G | 1.5 | 0.5–1.0 | None |
| 24 | 8620C | 8910 | 18G | 0.5 | 0.0–0.2 | None |

Note: The heat gun setting used in the examples in this table was 427° C. (800° F.).

TABLE 3

| EXAMPLE NUMBER | FILM TYPE | OVER-LAMINATE | DEVICE | LIFTING DISTANCE, d, mm. | VISIBLE HOLE SIZE, mm | FILM DAMAGE |
|---|---|---|---|---|---|---|
| C1 | 3500C | None | Brush[1] | 4.8 | 0.0 | Small wrinkle near one rivet |
| C2 | 3500C | None | Pad[2] | 2.0 | 0.0 | Surface impressions from CMP-1 and large wrinkles around each rivet. |
| C3 | 3500C | 8908 | Brush[1] | 5.0 | 0.0 | Several wrinkles around one rivet, change in film gloss near 2 rivets |
| C4 | 3500C | 8908 | Pad[2] | 4.0 | 0.0 | Surface impressions from CMP-1 around each rivet, large wrinkles around 3 rivets. |
| C5 | 3500C | 8910 | Brush[1] | 4.0 | 0.0 | Large wrinkle near 2 rivets |
| C6 | 3500C | 8910 | Pad[2] | 5.3 | 0.0 | None |
| C7 | 3540C | None | Brush[1] | 0.0 | 0.0–2.0 | Severe brush marks & wrinkles on all rivets, Some film tears |
| C8 | 3540C | None | Pad[2] | 4.0 | 0.0–1.0 | Surface impressions from CMP-1 on all rivets, Large wrinkle on 2 rivets |
| C9 | 180-10 | None | Brush[1] | 1.0 | 0.0–0.2 | Entrapped air around one rivet, small wrinkles around 2 rivets |
| C10 | 180-10 | None | Pad[2] | 2.0 | 0.0–0.2 | Slight change in film gloss around each rivet |
| C11 | 180-10C | None | Brush[1] | 1.25 | 0.0–0.2 | Small wrinkles around one rivet |
| C12 | 180-10C | None | Pad[2] | 2.0 | 0.0–0.2 | Small wrinkles around one rivet |
| C13 | 8620C | 8910 | Brush[1] | 2.25 | 0.0 | None |
| C14 | 8620C | 8910 | Pad[2] | 3.75 | 0.0 | Wrinkles around one rivet, slight change in gloss around one rivet. |

Note: The heat gun setting used in the examples in this table was 427° C. (800° F.).
[1]3M CMP-1 rivet finishing pad
[2]3M RBA-3 rivet finishing brush Referring to Table 2, Examples 1–9 demonstrate the that lifting distances d of less than 2.0 mm can be achieved with a changeable adhesive, as is used on 3M™ Scotchcal™ 3500C Marking Film. Moreover, as demonstrated by Examples 4–6 and Examples 7–9, lifting distances of less than 2.0 mm can, with suitable choice of probe diameter, also be achieved when an overlaminate is present. Historically, it has been noted that good conformance, as measured by lifting distance d, has been more difficult to achieve when changeable adhesives are used, due to the lower adhesion of such adhesives. Likewise, it has been found that films having an overlaminate are more difficult to conform to irregular surfaces, due to their increased thickness, which results in increased stiffness. Referring to Table 3, Comparative examples C1 and C2 demonstrate that, even without an overlaminate, the use of a brush to conform 3M™ Scotchcal™ 3500C Marking Film to a rivet head does not achieve a lifting distance in the range of 2.0 mm, while the use of pad or brush for this purpose produces significant surface damage and wrinkling. Comparative Examples C3–C6 further demonstrate that when overlaminates are present, lifting distances in the range of 2.0 mm are not achieved using the brush or the pad, and that significant surface damage and wrinkling can occur.

Referring again to Table 2, Examples 10–12 demonstrate the method of the present invention in conforming 3M™ Scotchcal™ 3540C Marking Film to rivet heads. The adhesive layer of 3540C Marking Film has a surface topography of the type disclosed in U.S. Pat. No. 6,197,397, to allow egress of trapped air. As shown in Table 2, probe diameters can be chosen to achieve lifting distances d of less than 2.0 mm with relatively little surface damage. Comparative Examples C7 and C8, however, show significant surface damage when either the brush or the pad are used.

Referring again to Table 2, Examples 13–16 demonstrate that with suitable choice of probe diameter, the present invention can be used to achieve lifting distances of 1.0 mm or less with a thinner vinyl backing, namely one having a thickness of 0.05 mm (2 mils), even with 3M™ Scotchcal™ 180-10 Marking Film, wherein the adhesive layer does not have a surface topography incorporating air egress channels. It was noted that when using 180-10 film, there was a noticeable amount of trapped air in the areas around each rivet, and it was speculated that this was due to the absence of air egress channels in the adhesive layer. Referring to Table 3, Comparative Examples C9 and C10, using 3M™ Scotchcal™ 180-10 Marking Film, show somewhat greater lifting distances d than those produced by the present invention in examples 13–16.

Examples 17–20 illustrate that when air egress channels are added to the adhesive layer, as is done in 3M™ Scotchcal™ 180-10C Marking Film, the amount of trapped air is reduced, and, with suitable choice of probe diameter, lifting distance d can be reduced to below 1.0 mm. Comparative examples C11 and C12 show comparable to somewhat larger lifting distances for this film, with a type of wrinkling not seen in samples produced in Examples 17–20.

Examples 21–24 demonstrate the use of a backing having a thickness of 0.05 mm (2 mils) with a vinyl overlaminate having a backing thickness of 0.05 mm (2 mils), resulting in a film having a total backing thickness of approximately 0.1 mm (4 mils). As shown by Example 24, with suitable choice of probe diameter, a lifting distance d of 0.5 mm can be achieved, whereas, as shown in Table 3, Comparative Examples C13 and C14, both the brush and pad were unable to achieve lifting distances below 2.0 mm. Moreover, Example 24, which produced the lowest value of d, also did not produce any noticeable film damage.

Examples 25–29 demonstrate that a variety of different types of tubing can be used as aspirator probes, and that the tubes need not be circular in cross section, nor do they need to be made of metal. A heat gun setting of 260° C. (500° F.) was used in these examples.

Example 25

A non-circular probe was made by flattening a 13 gauge stainless steel hypodermic syringe needle with a pliers to form an oblong cross section at the end of the tube. This flattened tube was then successfully used to aspirate detached film regions near several rivets.

Example 26

A 13 gauge syringe needle with a sharp beveled tip of the type used in hypodermic medical applications was used to aspirate several detached regions near rivet heads. While the aspiration and conformance of the film to the area around the rivet head was successful, the needle tended to scratch the film if not used with extreme care. It was also found that because of the beveled tip and the resulting elongated aperture at the end of the probe, the probe had to be inserted a greater distance into the detached region to achieve aspiration.

Example 27

A nonmetallic probe, in the form of a glass eyedropper tube having an inside diameter of about 1.5 mm and an outside diameter of about 2.5 mm was connected to a vacuum source via a vacuum line and used successfully to aspirate detached regions around several rivet heads.

Example 28

A nonmetallic probe, in the form of a plastic tube from a laboratory squirt bottle having an inside diameter of about 0.8 mm was successfully used to aspirate detached regions around several rivet heads. The plastic tube showed a tendency to clog after several aspirations, and also suffered heat damage, which may have contributed to the clogging.

Example 29

A nonmetallic probe, in the form of a length of flexible vacuum hose, was used to aspirate detached regions around several rivet heads. While the detached regions were successfully aspirated, there was a tendency for portions of the film to be sucked into the hose, and holes in the film having a diameter on the order of 3 mm were sometimes produced.

Examples 30 and 31 demonstrate that the order in which the steps of heating, probe insertion, and application of vacuum are performed can have a significant effect on the level of conformance achieved.

Example 30

A 13 gauge square tipped stainless steel tube was inserted into a detached region of laminated film prior to application of heat or vacuum. The probe was connected, via a flexible vacuum hose, to a closed vacuum valve, which was in turn connected to a vacuum source. The detached region of the film was then heat softened, after which the vacuum valve was opened, so as to apply vacuum to the detached region. Good conformance was achieved.

Example 31

A detached section of laminated film was first heat softened using a heat gun, after which a 13 gauge square tipped stainless steel needle, connected, via a flexible vacuum hose, to a closed vacuum valve, which was in turn connected to a vacuum source, was inserted into the detached region. The vacuum valve was then opened and the detached region aspirated. Limited conformance was achieved, due, at least in part, to the difficulty of achieving an adequate flow restriction or seal between the probe and the film. It was speculated that insertion of the probe into heated film, without the simultaneous application of vacuum, may have had a detrimental effect on the flow restriction or seal that could be achieved.

Example 32

A sheet of 3M™Scotchlite™ Plus Flexible Reflective Sheeting Series 680 reflective sheeting, commercially available from 3M Company, St. Paul, Minn., having dimensions of about 10 centimeters by 30 centimeters, was laminated to a test panel of the type used in Examples 1–24, using the same lamination procedure. A detached section over a rivet was heated with the heat gun used in Examples 1–24, but using a heat setting of 399° C. (750° F.) for a time of 1–3 seconds. A flat tipped 13 gauge needle attached via a vacuum hose to a vacuum pump was placed against the detached film section near a rivet edge and urged against the rivet base. The reflective sheeting rapidly collapsed around the rivet head to produce good conformance. The process was repeated for the remaining rivet heads on that test panel and on a second test panel. After conditioning the samples for 18 hours at room temperature, the average lifting distance d was 1.6 mm for the first panel and 0.8 mm for the second. The average sizes of the holes left by the aspirator probes were 0.7 mm for the first panel and 1.0 mm for the second panel. No film damage was observed. This was considered to be a significant achievement, since 3M™ Scotchlite™ Reflective Sheeting, having typical thicknesses in the range of 0.18–0.20 mm, is thicker than typical marking films, and is made up of a layer of glass beads held in place by a binder layer, along with other support material.

Example 33

Test panels were prepared as in Examples 7–9, using 3M™Scotchcal™ 3500C Marking Film with 3M™Scotchcal™ 8910 vinyl overlaminate laminated thereon. A shell and tip of a Pentel 0.5 mm P215 mechanical pencil was used as an aspirator probe. The shell and tip were connected to a vacuum hose which was in turn connected to a to a vacuum pump. Removal of detached regions and conformance around rivet heads proceeded rapidly, and the probe was found easy to maneuver around rivets, due to its familiar shape. The average value for lifting distance d after aging of the conformed film for 18 hours at room temperature was 0.7 mm, and the average size of the hole left in the film after aspiration was 0.8 mm. No film damage was observed.

Example 34

Two test panels were prepared as in Examples 7–9, using 3M™ Scotchcal™ 3500C Marking Film with 3M™Scotchcal™ 8910 vinyl overlaminate laminated thereon. A "goot"™ TP-100 desoldering gun, produced by Taiyo Electric Ind. Co. Ltd., Japan, and commercially available from Radio Shack Retail Stores, was used as the aspirator device. A flat tipped, 18 gauge stainless steel tube having a length of 1 centimeter was attached to the end of the desoldering gun and used as the aspirator probe. The TP-100 desoldering gun contains a vacuum source in the form a diaphragm. Detached sections of film around rivet heads on the prepared samples were heated using the same heat gun used in Examples 7–9, with an air temperature setting of 399° C. (750° F.), and the desoldering gun was used as an aspirator probe to aspirate the detached regions around the rivet heads on the two test panels. After aspiration, the panels were aged at room temperature for 18 hours and the lifting distances were measured. The average lifting distances were 0.9 mm for the first test panel and 0.25 mm for the second panel. The average whole sizes produced by the 18 gauge aspirator probe were 1.5 mm or the first panel and 1.0 mm for the second. No film damage was observed for panel 1, and small wrinkles were observed around three of the four rivets on panel 2. It was found that the diaphragm vacuum device in the desoldering gun produced adequate vacuum, thereby demonstrating that the vacuum source and aspirator probe can be integrated into a single, handheld device.

Example 35

A 4 centimeter by 12 centimeter sheet of 3M™Scotchcal™ 180-10 Marking Film was applied to a flat, painted, aluminum sheet in a manner which left detached regions having areas in the range of 4–100 square millimeters trapped between the film and the painted sheet. Each detached film section was heated using a heat gun setting of 399° C. (750° F.). The detached regions were aspirated with a flat tipped 18 gauge aspirator probe connected to a vacuum pump. At each detached region, the aspirator probe formed an aperture in the film, the trapped air was quickly aspirated away, and the film conformed to the surface. The only visible indication of the aspiration was the presence of small marks having diameters of about 0.1–1.0 mm in diameter, corresponding to the points of contact of the needle with the film.

Example 36

A test panel was prepared by laminating a 4 centimeter× 12 centimeter sheet of 3M™ Scotchcal™ 3500C Marking Film onto an aluminum sheet having 3 circular indentations such that the film bridged the indentations. Each indentation was about 6 mm deep and about 28 mm in diameter. The film section bridging each of the indentations was heated using a heat gun air temperature setting of 399° C. (750° F.) and aspirated with an 18 gauge stainless steel probe connected to a vacuum source by slowly moving the probe into contact with the detached section. As each detached region was aspirated, the probe was moved toward the indentation to follow the film section as it conformed to the indentation, so as to maintain communication between the detached region and the probe. In each case, the film section was successfully conformed to the indentation.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

The invention claimed is:

1. A method of applying a film to a substrate comprising:
providing a film having a layer of adhesive;
placing the film on a substrate such that a portion of the adhesive layer is in contact with the substrate;
selecting a region between the film and the substrate where the adhesive layer is not in contact with the substrate;
softening the selected region using heat;
contacting the film adjacent the selected region with a hollow elongated probe having an outer end with an opening lying in a plane substantially perpendicular to the longitudinal axis of the probe;
moving the outer end of the probe through the film and into the selected region; and
applying vacuum to the selected region through the probe in order to aspirate air from the region and urge the film adjacent the selected region toward the substrate.

2. A method of applying a film to a substrate according to claim 1 wherein the act of moving the outer end of the probe through the film includes the act of drawing a section of the film into the probe by vacuum.

3. A method of applying a film to a substrate according to claim 1 wherein the film is a thermoplastic film.

4. A method of applying a film to a substrate according to claim 1 wherein vacuum is applied to the probe prior to the act of moving the probe into the selected region.

5. A method of applying a film to a substrate according to claim 1 wherein vacuum is applied to the probe prior to the act of heat softening the film, and wherein the act of contacting the film with the probe is carried out subsequent to the act of softening the selected region.

6. A method of applying a film to a substrate according to claim 1 wherein the adhesive layer comprises channels for the egress of air or other fluids.

7. A method of applying a film to a substrate according to claim 1 wherein the film further comprises a graphic image applied thereto.

8. A method of applying a film to a substrate according to claim 1 wherein the selected region is adjacent to a protrusion on the substrate.

9. A method of applying a film to a substrate according to claim 1 wherein the act of contacting the film with a probe includes the act of arranging a number of probes in an array.

10. A method of applying a film to a substrate according to claim 9 wherein the probes in the array are resiliently mounted.

11. A method of applying a film to a substrate according to claim 9 wherein at least some of the probes of the array are movable relative to other probes of the array.

12. A method of applying a film to a substrate according to claim 1 wherein the act of contacting the film with a probe is carried out with a handheld device that includes a source of vacuum.

13. A method of applying a thermoplastic film to a substrate having a plurality of rivets comprising:
   providing a thermoplastic film having a layer of adhesive;
   placing the film on the substrate and over the rivet;
   heat softening the film in an area next to the rivet;
   while the film is heat softened, moving the outer end of a hollow probe through the film and into a region next to the rivet; and
   applying sufficient vacuum to the probe to snap the film against the substrate.

14. A method of applying a thermoplastic film to a substrate according to claim 13 wherein the act of moving the outer end of a hollow probe through the film includes the act of drawing a section of the film into the probe by vacuum.

15. A method of applying a thermoplastic film to a substrate according to claim 13 wherein vacuum is applied to the probe prior to the act of moving the outer end of the hollow probe through the film.

16. A method of applying a thermoplastic film to a substrate according to claim 13 wherein vacuum is applied to the probe prior to the act of heat softening the film.

17. A method of applying a thermoplastic film to a substrate according to claim 13 wherein the adhesive layer comprises channels for egress of air or other fluids.

18. A method of applying a thermoplastic film to a substrate according to claim 13 wherein the film further comprises a graphic image applied thereto.

19. A method of applying a thermoplastic film to a substrate according to claim 13 wherein the act of moving the outer end of a hollow probe through the film is carried out with a hand-held device that includes a source of vacuum.

* * * * *